US006988737B1

(12) United States Patent
Clark

(10) Patent No.: US 6,988,737 B1
(45) Date of Patent: Jan. 24, 2006

(54) BEACH BUD CART

(76) Inventor: Patrick Frank Clark, 3505 Chapel Dr., Sarasota, FL (US) 34234

( * ) Notice: Subject to any disclaimer, the term of this patent is extended or adjusted under 35 U.S.C. 154(b) by 0 days.

(21) Appl. No.: 10/360,600

(22) Filed: Feb. 10, 2003

(51) Int. Cl.
*B62B 1/10* (2006.01)
(52) U.S. Cl. .................................................. 280/47.26
(58) Field of Classification Search ............ 280/47.17, 280/47.18, 47.19, 47.24, 47.26, 47.34, 47.35, 280/63, 79.2
See application file for complete search history.

(56) References Cited

U.S. PATENT DOCUMENTS

| 1,921,251 | A | * | 8/1933 | Gerould | 280/47.19 |
| 2,461,482 | A | * | 2/1949 | Schaus | 280/654 |
| 2,964,328 | A | * | 12/1960 | Muir | 280/47.19 |
| 4,247,130 | A | * | 1/1981 | Paterson | 280/654 |
| 4,887,837 | A | | 12/1989 | Bonewicz, Jr. et al. | 280/654 |
| 5,333,885 | A | * | 8/1994 | Pullman | 280/47.19 |
| 5,464,237 | A | * | 11/1995 | Saporiti | 280/30 |
| 5,620,191 | A | * | 4/1997 | Sayette | 280/13 |
| 5,653,458 | A | * | 8/1997 | Chaparian | 280/30 |
| 5,660,403 | A | | 8/1997 | O'Neill et al. | 280/47.19 |
| 6,036,203 | A | | 3/2000 | Tyus et al. | 280/47.26 |
| 6,113,129 | A | | 9/2000 | Marques et al. | 280/654 |
| 6,131,925 | A | | 10/2000 | Weldon | 280/30 |
| 6,457,737 | B1 | * | 10/2002 | King | 280/651 |
| 6,474,677 | B2 | * | 11/2002 | Kasuya | 280/639 |

FOREIGN PATENT DOCUMENTS

| FR | 2683511 | * | 5/1993 | 280/79.2 |
| WO | 91/05720 | * | 5/1991 | 280/47.26 |

* cited by examiner

*Primary Examiner*—Frank Vanaman
(74) *Attorney, Agent, or Firm*—Charles W. Chandler

(57) ABSTRACT

A beach cart having a main compartment with a front opening. A pair of doors hingedly connected to the compartment may be closed to block the opening or opened to a position in which they cooperate with a pair of wide wheels to support the compartment in an upright position. The cart is adapted to support various accessories such as an umbrella, a chair, and cooler cups.

12 Claims, 3 Drawing Sheets

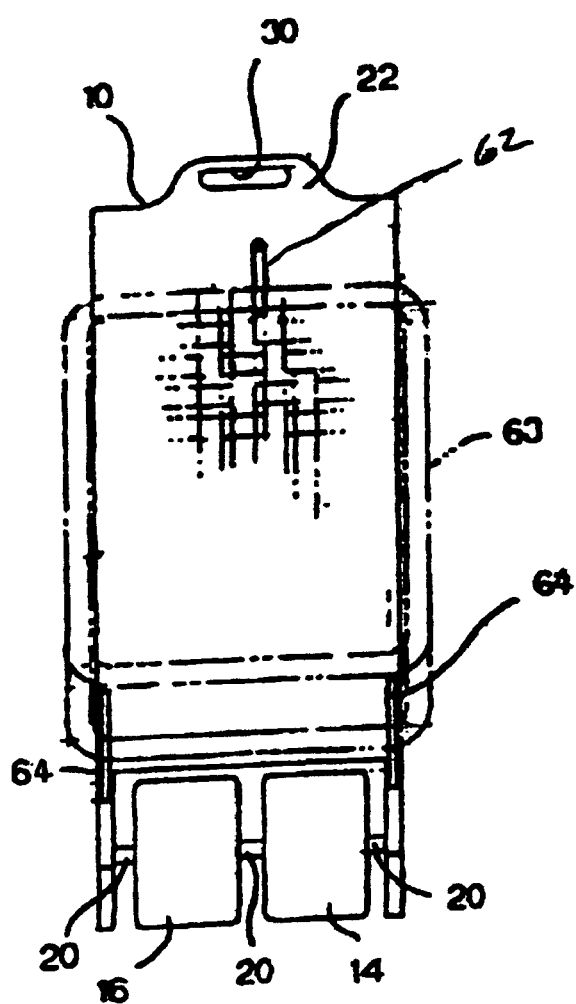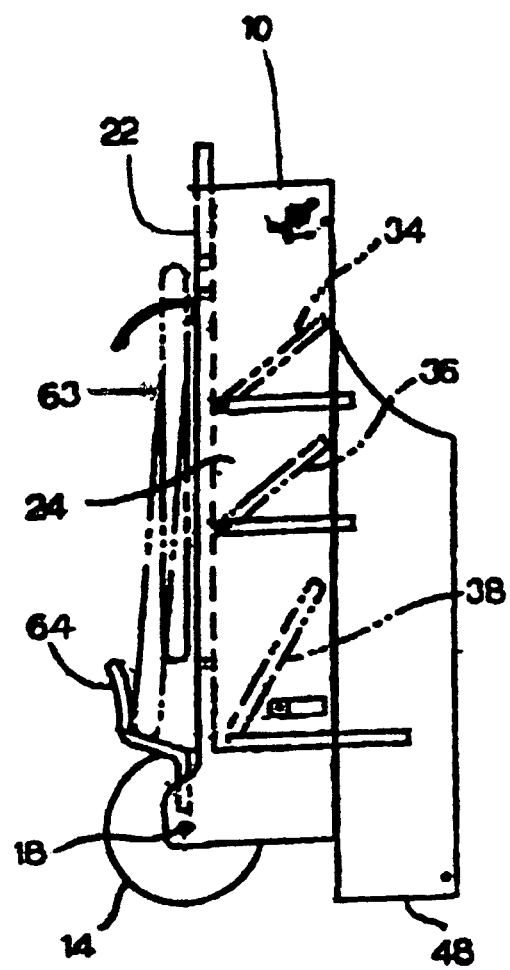
FIG. 4
FIG. 5

BEACH BUD CART

BACKGROUND AND SUMMARY OF THE INVENTION

Beach carts are used to transport various items to a sandy beach location. They are sometimes difficult to move or to stand in an upright position because of the soft sand on which they are supported.

The prior art discloses a variety of carts, some used for the beach. Examples of such prior art include U.S. Pat. No. 6,131,925 issued Oct. 17, 2000 to Paul Weldon, for "Beach Buddy"; U.S. Pat. No. 6,113,129 issued Sep. 5, 2000 to Monica Dubowski Marques and Marcelo Marques for "Wheeled Beach Cart Construction"; U.S. Pat. No. 6,036,203 issued Mar. 14, 2000 to Sierra Tyus and Yolounda Tyus for "Tool Dolly"; U.S. Pat. No. 5,660,403 issued Aug. 26, 1997 to J. Douglas O'Neill et al. for "Multipurpose Beach Cart"; and U.S. Pat. No. 4,887,837 issued Dec. 19, 1989 to Theodore J. Bonewicz and Henry S. Leichter for "Carrier for Use on Beaches, etc."

The broad purpose of the present invention is to provide an improved beach cart having a main compartment that has a height greater than its width and supported on a pair of relatively wide wheels to provide adequate traction on a soft sandy surface. A pair of doors on the front of the cart may be closed to store the contents of the cart, or opened to a position in which the lower edges of the doors cooperate with the wheels in supporting the cart in an upright position. The preferred cart is adapted to store a variety of items, for example, an umbrella, a radio, suntan lotions, drink holders for drinks, beach towels, a cooler and cooler cups. Inner shelves in the compartment are folded when the doors are closed, or unfolded to prevent the doors from accidentally being closed.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 4 is a view from the opposite side of that of FIG. 3; and

FIG. 5 is a view showing a beach chair mounted on the cart; and with the umbrella holders removed.

DESCRIPTION OF THE PREFERRED EMBODIMENT

Figure 1:
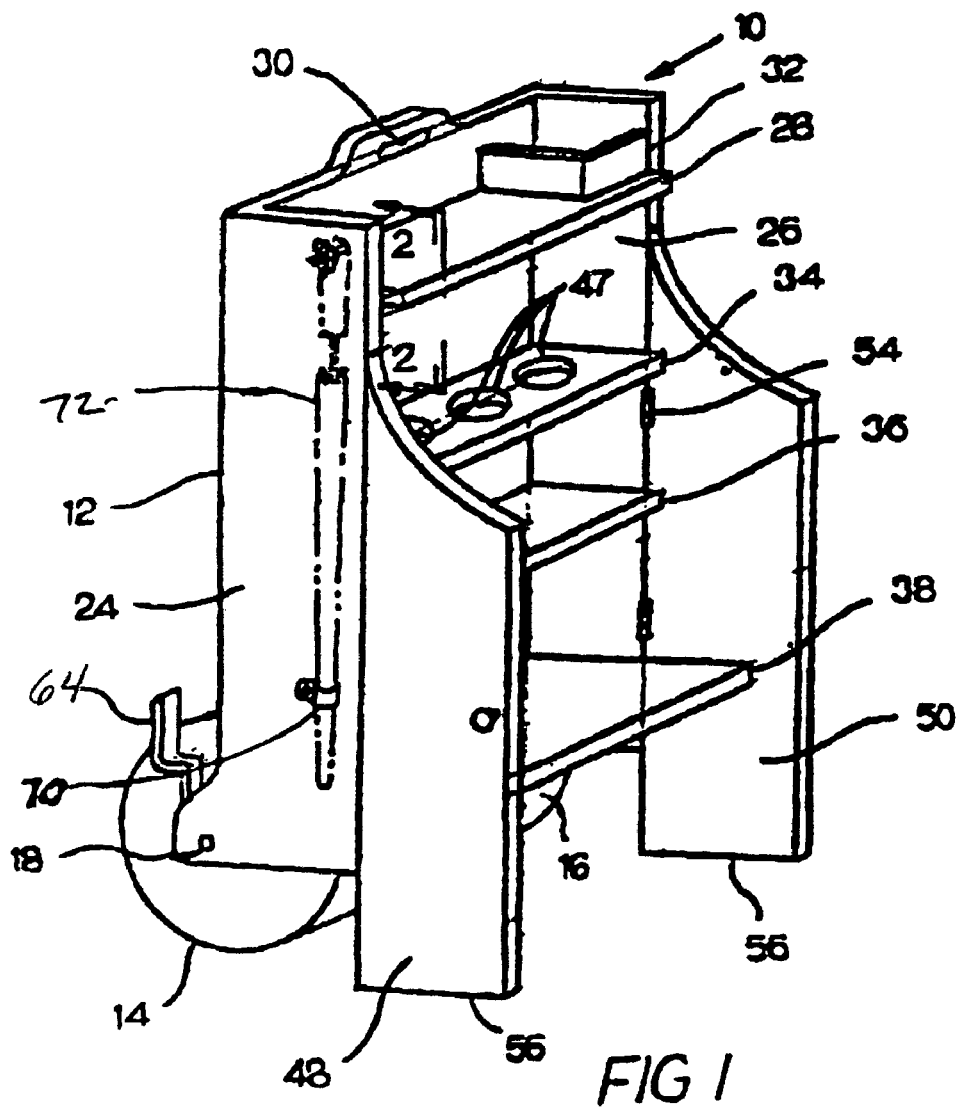
FIG. 1 is a perspective view showing a preferred beach cart with the doors in the open position.

Referring to the drawings, a preferred beach cart 10 comprises a main compartment 12, preferably formed of a lightweight plastic. The main compartment is supported on a pair of relatively wide wheels 14 and 16. The wheels are supported on an axle 18 attached along the lower edges of the compartment. Preferably the wheels have an 8" diameter, a 5" width and are separated on the axle by spacer means 20.

Figure 3:
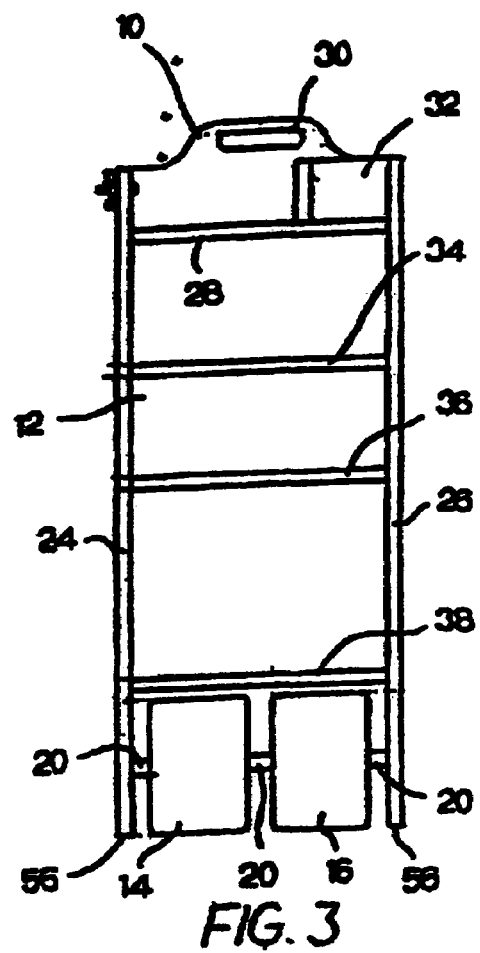
FIG. 3 is a front elevational view of the beach cart, with the doors removed.

The main compartment has a back wall 22 which, for illustrative purposes, is about 15" wide and 32½" high. A pair of side walls 24 and 26 have their rear edges attached to the side edges of the back wall. The side walls are about 6" wide and 29½" high. A short shelf 28 spans the distance between the two side walls, as illustrated in FIG. 3, and has a depth slightly greater than the width of the side walls.

An opening 30 forms a handle adjacent the top edge of the back wall for pulling the cart. Other forms of handles might be suitable, such as a retractable or folding handle, not shown. A right angle wall 32 mounted on shelf 28 forms a rectangular, open top compartment for storing miscellaneous articles.

Figure 2:
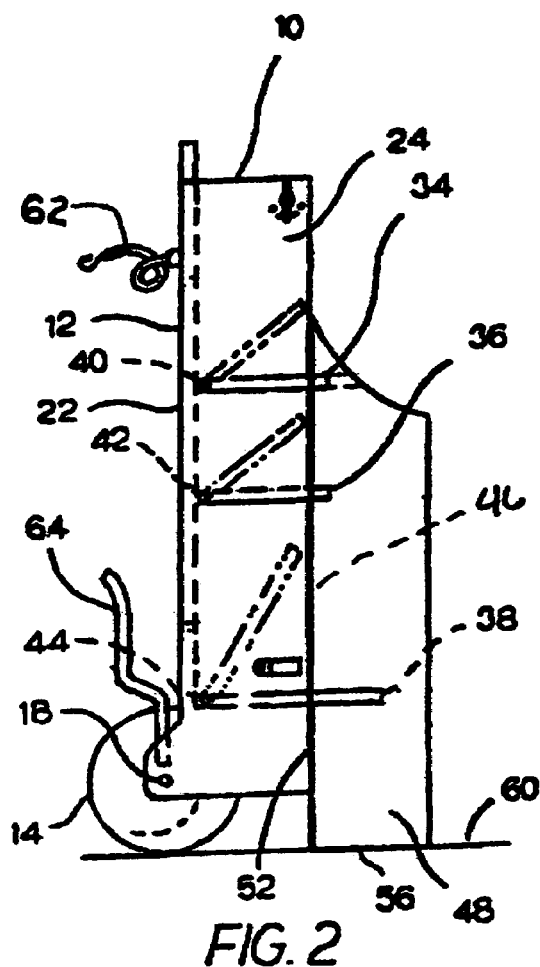
FIG. 2 is a side elevational view of the beach cart.

Referring to FIG. 2, three shelves 34, 36 and 38 are hingedly mounted by piano hinges 40, 42 and 44 to the back wall. The piano hinges permit the shelves to be lowered to a horizontal position, as illustrated in FIG. 1, or raised to an upper position illustrated in FIG. 2. In the lower position, the shelves have a depth that is greater than the width of the side walls so that the outer edges of the shelves extend beyond the front edge 46 of the compartment.

Upper shelf 34 has three openings 47, sized to support a cooler cup. Bottom shelf 38, in its lower position, forms a bottom wall for the compartment. The bottom shelf is about 5¼" above the lower edges of the side walls.

A pair of doors 48 and 50 are attached by hinges 52 and 54 to the front vertical edges of the side walls, as viewed in FIGS. 1 and 2. The doors have a height and are mounted in such a manner that their top edges are below fixed shelf 28. The door bottom edges 56 are disposed in the same horizontal plane 60 as the lower ground-engaging edges, of the wheels, as best illustrated in FIG. 2. Doors 48 and 50 have a combined width that is less than the distance between side walls 24 and 26. In their open position, the lower edges of the two doors cooperate with the wheels in supporting the compartment in an upright position as viewed in FIG. 1. When the two doors are open, shelves 34, 36 and 38 can be lowered to a horizontal position in which their outer edges extend beyond the front opening of the compartment and help prevent the doors from accidentally being closed.

Referring to FIGS. 4 and 5, a bungy cord 62 is attached to the back wall for mounting a chair 63 on the back wall. A pair of lower strap hooks 64 are pivotally mounted on compartment 12 for receiving the bottom of the chair. Hooks 64 may be swiveled toward the back wall when not in use.

Figure 1A:
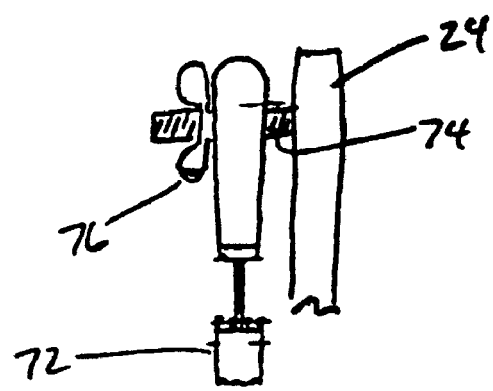
FIG. 1A is a view of the umbrella holder.

An umbrella clip 70 is attached to side wall 24 for receiving the lower end of an umbrella 72. A bolt 74 and a wing nut 76 receive and support the upper end of the umbrella as shown in FIG. 1A.

Thus it is to be understood that I have described an improved beach cart useful for hauling various articles. The preferred cart may be disposed in an upright position in which the doors in their open position cooperate with the two wheels in supporting the cart. When the cart is moved to another location, the folding shelves are raised and the doors closed.

The cart handle then can be lowered in the counterclockwise position as viewed in FIG. 2, and pulled by the user across soft sand.

Having described my invention, I claim:

1. A portable cart comprising:
   a main compartment having a pair of spaced parallel side walls, each of said side walls having front, rear and bottom edges;
   a back wall attached to the rear edges of the side walls;
   a bottom wall attached to the bottom edges of the side walls to form a front opening;

at least two wheels being relatively wide compared to their diameter for supporting the main compartment on sand;

said wheels being rotatably mounted adjacent the bottom of the main compartment;

the wheels supporting the side walls above a ground-engaging surface when the main compartment is in an upright position;

a door hingedly connected along the front edge of at least one of the side walls for movement about a vertical axis between a closed position, parallel to the back wall, and blocking access through the front opening into the compartment, and an open position permitting access through the front opening into the compartment; and the door having a bottom ground-engaging edge disposed adjacent the around in both said open and said closed positions such that the main compartment is self-supporting in said upright position when the door is in said open position, and the wheels and the lower edge of the door engage a ground surface.

2. A portable cart as defined in claim 1, including handle means on the back wall for pulling the container on wheels.

3. A portable cart as defined in claim 1, including a second door hingedly attached to the front edge of the other of said side walls, the second door being movable between a closed position in which it cooperates with the first mentioned door to block access through the front opening, and an open position in which the second door permits access through the front opening into the compartment.

4. A portable cart as defined in claim 3, in which the second door has a lower ground-engaging edge.

5. A portable cart as defined in claim 1, including at least one shelf connected between and to the side walls in a spaced position above the bottom wall.

6. A portable cart as defined in claim 5, in which the shelf has a cup-receiving opening.

7. A portable cart as defined in claim 5, in which the shelf is hingedly connected to the back wall for movement toward a lower position blocking the door from being moved to said closed position.

8. A portable cart as defined in claim 1, including a holder attached to one of the side walls for supporting an umbrella.

9. A portable cart as defined in claim 1, including a bungee cord attached to one of said walls for supporting a chair.

10. A portable cart as defined in claim 1, in which the wheels are disposed in a side-by-side position beneath the bottom wall.

11. A portable cart as defined in claim 1, in which said one of the side walls has a planar configuration, and the door has a planar configuration disposed in a coplanar position with the side wall when the door is in said open position.

12. A portable cart as defined in claim 1, in which the bottom wall is planar, and the ground-engaging edge of the door cooperates with the wheels to support the bottom wall parallel to a ground-engaging surface when the compartment is in said upright position.

\* \* \* \* \*